(12) United States Patent
Bell et al.

(10) Patent No.: US 6,207,283 B1
(45) Date of Patent: Mar. 27, 2001

(54) POLYMER

(75) Inventors: Peter Bell, Köln; Günter Helling, Odenthal; Beate Weber, Leichlingen; Ralf Büscher, Lohmar; Lothar Endres, Bergisch Gladbach; Lothar Rosenhahn; Rainer Scheerer, both of Köln; Lydia Simon, Wülfrath; Thomas Stetzer, Langenfeld, all of (DE)

(73) Assignee: Agfa-Gevaert (BE)

( * ) Notice: Subject to any disclaimer, the term of this patent is extended or adjusted under 35 U.S.C. 154(b) by 0 days.

(21) Appl. No.: 09/185,150

(22) Filed: Nov. 3, 1998

(30) Foreign Application Priority Data

Nov. 11, 1997 (DE) ................................. 197 49 721

(51) Int. Cl.⁷ .................................... B41M 5/00
(52) U.S. Cl. .................. 428/411.1; 428/195; 428/341; 428/478.2; 430/523
(58) Field of Search ...................... 428/195, 341, 428/411.1, 478.2; 430/627, 523; 528/425

(56) References Cited

U.S. PATENT DOCUMENTS 4,724,197   2/1988   Matejec et al. ...................... 430/377

Primary Examiner—Bruce H. Hess
(74) Attorney, Agent, or Firm—Connolly Bove Lodge & Hutz LLP

(57) ABSTRACT

A polymer of the formula (I):

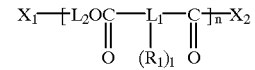

in which
$X_1$ means H or $(R_1)_{l+1}$—$L_1$CO—,
$X_2$ means —$(L_2)_m$—OH or

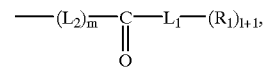

$R_1$ means —$COO^-M^+$, —$SO_3^-M^+$ or $(M^+)_2PO_3^{2-}$,
$L_1$ means alkylene, arylene, aralkylene or cycloalkylene,
$L_2$ means the residue of a polyether having an average molecular weight of 200 to 3000 (number average),
$M^+$ means a cation,
l means a number from 0 to 4,
m means a number 0 or 1 and
n means a number from 0 to 20, wherein
m+n is ≧1.

9 Claims, No Drawings

POLYMER

This invention relates to a novel polymer which may advantageously be used in image-recording materials.

Polymers are used for various reasons in image-recording materials, for example for improving breaking strength, as auxiliaries for incorporating hydrophobic substances or for improving the sensitivity/grain ratio of photographic silver halide materials.

A novel class of polymers has now been developed which have advantageous properties in various image-recording materials. Thus, for example, it is surprisingly possible to reduce the silver halide application rate in photographic silver halide materials, or to improve absorbency for inkjet inks in inkjet materials.

The present invention accordingly provides a polymer of the general formula (I):

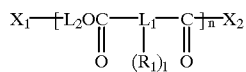

(I)

in which $X_1$ means H or $(R_1)_{l+1}$—$L_1$CO—, $X_2$ means —$(L_2)_m$—OH or

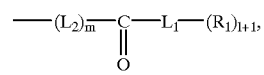

$R_1$ means —COO$^-$M$^+$, —SO$_3^-$M$^+$ or $(M^+)_2$PO$_3^{2-}$, $L_1$ means alkylene, arylene, aralkylene or cycloalkylene, $L_2$ means the residue of a polyether having an average molecular weight of 200 to 3000, preferably of 200 to 1500 (number average), $M^+$ means a cation, preferably H$^+$, Na$^+$, K$^+$, Li$^+$, l means a number from 0 to 4, m means a number 0 or 1 and n means a number from 0 to 20, preferably from 0 to 10, wherein m+n is $\geq 1$.

Examples of polymers according to the invention are:

I-1

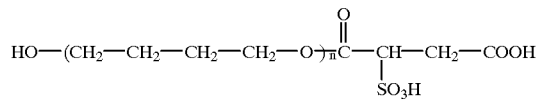

n~9

I-2

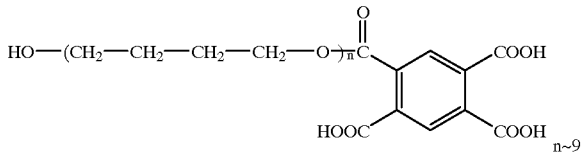

n~9

I-3

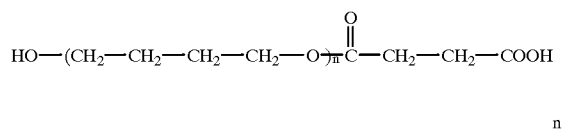

n~9

I-4

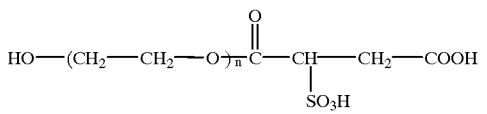

n~9

I-5

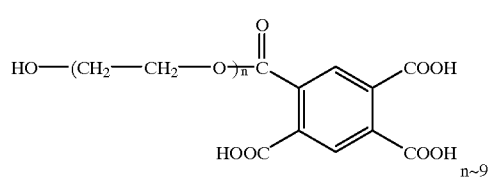

n~9

I-6

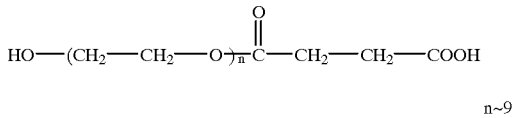

n~9

I-7

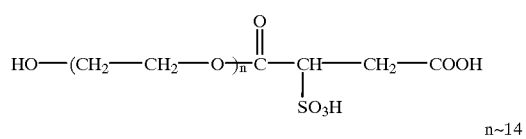

n~14

I-8

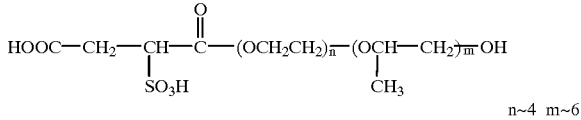

n~4 m~6

I-9

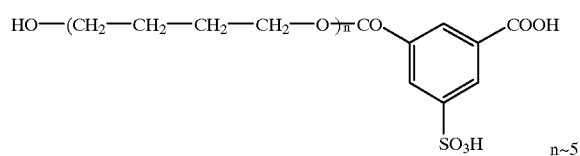

n~5

I-10

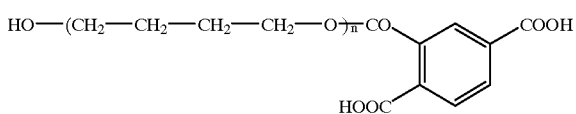

n~11

-continued

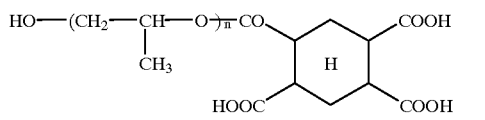
n~8

I-11

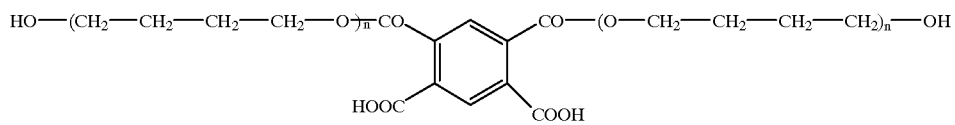
n~9

I-12

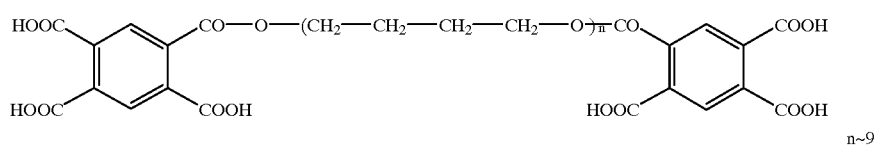
n~9

I-13

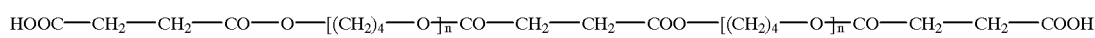
n~6

I-14

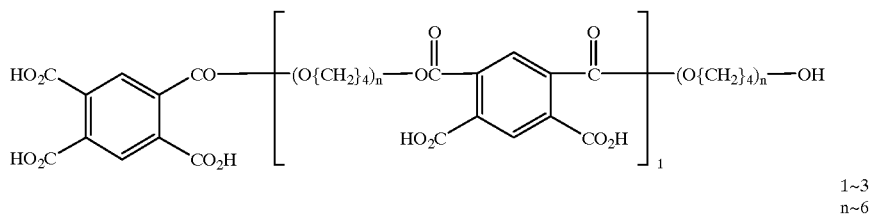
1~3
n~6

I-15

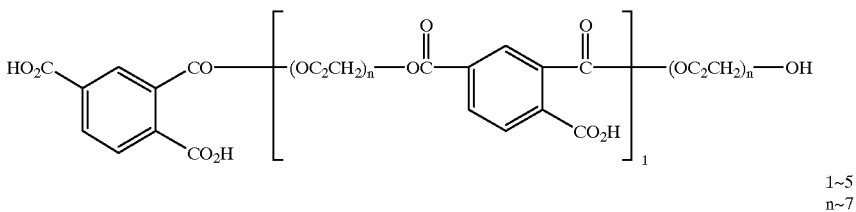
1~5
n~7

I-16

The polymers according to the invention are conveniently produced by polycondensation from a polyether diol and a polyacid or polyanhydride. The stated formulae are idealised.

The present invention also provides an image-recording material having a support with at least one image-recording layer and optionally at least one further layer, characterised in that the image-recording layer and/or the further layer contains at least one polymer of the formula (I).

A photographic silver halide material and particularly preferably a colour photographic silver halide material may in particular be considered as the image-recording material.

Examples of colour photographic materials are colour negative films, colour reversal films, colour positive films, colour photographic paper, colour reversal photographic paper, colour-sensitive materials for the dye diffusion transfer process or the silver dye bleaching process. A review is given in *Research Disclosure* 37038 (1995) and *Research Disclosure* 38957 (1996).

The photographic materials comprise a support onto which at least one photosensitive silver halide emulsion layer is applied. Thin films and sheets are in particular suitable as supports. A review of support materials and the auxiliary layers applied to the front and reverse sides of which is given in *Research Disclosure* 37254, part 1 (1995), page 285 and in Research Disclosure 38957, part XV (1996), page 627.

The colour photographic materials conventionally contain at least one red-sensitive, one green-sensitive and one blue-sensitive silver halide emulsion layer, optionally together with interlayers and protective layers.

Depending upon the type of the photographic material, these layers may be differently arranged. This is demonstrated for the most important products:

Colour photographic films such as colour negative films and colour reversal films have on the support, in the stated sequence, 2 or 3 red-sensitive, cyan-coupling silver halide emulsion layers, 2 or 3 green-sensitive, magenta-coupling silver halide emulsion layers and 2 or 3 blue-sensitive, yellow-coupling silver halide emulsion layers. The layers of identical spectral sensitivity differ with regard to their photographic sensitivity, wherein the less sensitive sub-layers are generally arranged closer to the support than the more highly sensitive sub-layers.

A yellow filter layer, which prevents blue light from reaching the underlying layers, is conventionally located between the green-sensitive and blue-sensitive layers.

Possible options for different layer arrangements and the effects thereof on photographic properties are described in *J. Inf. Rec. Mats.*, 1994, volume 22, pages 183–193 and in Research Disclosure 38957, part XI (1996), page 624.

Colour photographic paper, which is usually substantially less photosensitive than a colour photographic film, conventionally has on the support, in the stated sequence, one blue-sensitive, yellow-coupling silver halide emulsion layer, one green-sensitive, magenta-coupling silver halide emulsion layer and one red-sensitive, cyan-coupling silver halide emulsion layer; the yellow filter layer may be omitted.

The number and arrangement of the photosensitive layers may be varied in order to achieve specific results. For example, all high sensitivity layers may be grouped together in one package of layers and all low sensitivity layers may be grouped together in another package of layers in order to increase sensitivity (DE-25 30 645).

The substantial constituents of the photographic emulsion layers are binder, silver halide grains and colour couplers.

Details of suitable binders may be found in Research Disclosure 37254, part 2 (1995), page 286 and in Research Disclosure 38957, part IIA (1996), page 598.

Details of suitable silver halide emulsions, the production, ripening, stabilisation and spectral sensitisation thereof, including suitable spectral sensitisers, may be found in *Research Disclosure* 37254, part 3 (1995), page 286 and in *Research Disclosure* 37038, part XV (1995), page 89 and in *Research Disclosure* 38957, part VA (1996), page 603.

Photographic materials with camera sensitivity conventionally contain silver bromide-iodide emulsions, which may optionally also contain small proportions of silver chloride. Photographic print materials contain either silver chloride-bromide emulsions with up to 80 mol. % of AgBr or silver chloride-bromide emulsions with above 95 mol. % of AgCl.

Details relating to colour couplers may be found in *Research Disclosure* 37254, part 4 (1995), page 288, in *Research Disclosure* 37038, part II (1995), page 80 and in *Research Disclosure* 38957, part XB (1996), page 616. The maximum absorption of the dyes formed from the couplers and the developer oxidation product is preferably within the following ranges: yellow coupler 430 to 460 nm, magenta coupler 540 to 560 nm, cyan coupler 630 to 700 nm.

In order to improve sensitivity, grain, sharpness and colour separation in colour photographic films, compounds are frequently used which, on reaction with the developer oxidation product, release photographically active compounds, for example DIR couplers which eliminate a development inhibitor.

Details relating to such compounds, in particular couplers, may be found in *Research Disclosure* 37254, part 5 (1995), page 290, in *Research Disclosure* 37038, part XIV (1995), page 86 and in *Research Disclosure* 38957, part XC (1996), page 618.

Colour couplers, which are usually hydrophobic, as well as other hydrophobic constituents of the layers, are conventionally dissolved or dispersed in high-boiling organic solvents. These solutions or dispersions are then emulsified into an aqueous binder solution (conventionally a gelatine solution) and, once the layers have dried, are present in the layers as fine droplets (0.05 to 0.8 $\mu$m in diameter).

Suitable high-boiling organic solvents, methods for the introduction thereof into the layers of a photographic material and further methods for introducing chemical compounds into photographic layers may be found in *Research Disclosure* 37254, part 6 (1995), page 292.

The non-photosensitive interlayers generally located between layers of different spectral sensitivity may contain agents which prevent an undesirable diffusion of developer oxidation products from one photosensitive layer into another photosensitive layer with a different spectral sensitisation.

Suitable compounds (white couplers, scavengers or DOP scavengers) may be found in *Research Disclosure* 37254, part 7 (1995), page 292, in *Research Disclosure* 37038, part III (1995), page 84 and in *Research Disclosure* 38957, part XD (1996), page 621 et seq.

The photographic material may also contain UV light absorbing compounds, optical brighteners, spacers, filter dyes, formalin scavengers, light stabilisers, anti-oxidants, $D_{min}$ dyes, plasticisers (latices), biocides and additives to improve coupler and dye stability, to reduce colour fogging and to reduce yellowing and others. Suitable compounds may be found in *Research Disclosure* 37254, part 8 (1995), page 292, in *Research Disclosure* 37038, parts IV, V, VI, VII, X, XI and XIII (1995), pages 84 et seq. and in *Research Disclosure* 38957, parts VI, VIII, IX and X (1996), pages 607 and 610 et seq..

The layers of colour photographic materials are conventionally hardened, i.e. the binder used, preferably gelatine, is crosslinked by appropriate chemical methods. Suitable hardener substances may be found in *Research Disclosure* 37254, part 9 (1995), page 294, in *Research Disclosure* 37038, part XII (1995), page 86 and in *Research Disclosure* 38957, part IIB (1996), page 599.

Once exposed with an image, colour photographic materials are processed using different processes depending upon their nature. Details relating to processing methods and the necessary chemicals are disclosed in *Research Disclosure* 37254, part 10 (1995), page 294, in *Research Disclosure* 37038, parts XVI to XXIII (1995), pages 95 et seq. and in *Research Disclosure* 38957, parts XVIII, XIX and XX (1996), pages 630 et seq. together with example materials.

An inkjet material may also be considered as the image-recording material.

The inkjet process is known (c.f. for example the chapter *Ink Jet Printing* by R. W. Kenyon in *Chemistry & Technology of Printing & Imaging systems,* editor Peter Gregory, Blackie Academic & Professional, Chapman & Hall 1996, pages 113 to 138 and the literature cited therein).

In this process, ink jet images are produced by spraying a fine, imagewise modulated jet of a dye solution or dispersion onto a recording material. Better quality recording materials have an image-receiving layer on a support material, the layer containing an agent intended to bind the ink jet dye in a spread- and smudge-resistant manner. EP 609 930 accordingly discloses the provision of an ink receiving layer on the support, the layer containing at least one mordant which is a polymer or copolymer having a phosphonium group. The stated document gives a comprehensive description of the prior art relating to ink jet materials. The results achieved hitherto are, however, not adequate.

The object of the invention was to provide an ink jet recording material with which in particular smudge resistant ink jet images are produced.

Suitable agents, which bind the inkjet dyes in a spread- and smudge-resistant manner are, for example, cationic mordants, dye-complexing compounds, aluminium hydroxide.

Cationic mordants are preferred because azo dyes having acid groups are conventionally used as inkjet dyes.

The cationic mordants may be soluble or dispersible in water. The cationic mordants have an average molecular weight (weight average) of preferably at least 2000, in particular of at least 20000.

Inkjet materials additionally contain binders, optionally spacers, UV absorbers, image stabilisers and are hardened with hardeners.

Suitable binders for the applied layers are described in *Research Disclosure* 37254, part 2 (1995), page 286 and *Research Disclosure* 38957, part IIA (1996), page 598.

Gelatine is preferred.

Suitable spacers are in particular spherical, have an average particle diameter of 1 to 50 μm, in particular of 5 to 20 μm and have a narrow grain size distribution.

Suitable spacers consist, for example, of polymethyl methacrylate, polystyrene, poly-vinyltoluene, polyamide, silicon dioxide and insoluble starch.

Suitable UV absorbers are described in *Research Disclosure* 2439 (1984), 37254, part 8 (1995), page 292, 37038, part X (1995), page 85 and 38957, part VI (1996), page 607 and EP 306 083 and 711 804.

Suitable dye stabilisers are known from *Research Disclosure* 37254, part 8 (1995), page 292 and 38957, part X (1996), pages 621 et seq. and DE 43 37 862, GB 20 88 777, EP 373 573, EP 685 345 and EP 704 316.

Suitable hardeners are described in *Research Disclosure* 37254, part 9 (1995), page 294; 37038 part XII (1995), page 86 and 38957, part IIB (1996), pages 599 et seq..

Surprisingly, the smudge resistance of the inkjet image is improved if the material contains a polymer of the formula I in one layer.

The polymers of the formula I are used in the image-recording materials in quantities of 20 to 1000 mg/m$^2$, preferably of 50 to 500 mg/m$^2$. When gelatine is used as the binder, the quantity of polymer of the formula I in the layer concerned is 5 to 50 wt. %, preferably 10 to 40 wt. % of the quantity of gelatine.

EXAMPLES

Example 1

A colour photographic recording material for colour negative development was produced (layer structure 1A) by applying the following layers in the stated sequence onto a transparent cellulose triacetate film base. Quantities are all stated per 1 m$^2$. The silver halide application rate is, stated as the corresponding quantities of AgNO$_3$; the silver halides are stabilised with 0.5 g of 4-hydroxy-6-methyl-1,3,3a,7-tetraazaindene per mole of AgNO$_3$.

1st layer (Anti-halo layer)

0.3 g of black colloidal silver
   1.2 g of gelatine
   0.4 g of UV absorber UV-1
   0.02 g of tricresyl phosphate (TCP)

2nd layer (Micrate interlayer)

0.25 g of AgNO$_3$ of a micrate Ag(Br,I) emulsion, average grain diameter 0.07 μm, 0.5 mol. % iodide
   1.0 g of gelatine 3rd layer (Low sensitivity, red-sensitive layer)

2.7 g of AgNO$_3$ of a spectrally red-sensitised Ag(Br,I) emulsion containing 4 mol. % iodide, average grain diameter 0.5 μm
   2.0 g of gelatine
   0.88 g of colourless coupler C-1
   0.02 g of DIR coupler D-1
   0.05 g of coloured coupler RC-1
   0.07 g of coloured coupler YC-1
   0.75 g of TCP 4th layer (High sensitivity, red-sensitive layer)

2.2 g of AgNO$_3$ of a spectrally red-sensitised Ag(Br,I) emulsion, 12 mol. % iodide, average grain diameter 1.0 mm
   1.8 g of gelatine
   0.19 g of colourless coupler C-2
   0.17 g of TCP 5th layer (Interlayer)

0.4 g of gelatine
   0.15 g of white coupler W-1
   0.06 g of aurintricarboxylic acid, Al salt 6th layer (Low sensitivity, green-sensitive layer)

1.9 g of AgNO$_3$ of a spectrally green-sensitised Ag(Br,I) emulsion, 4 mol. % iodide, average grain diameter 0.35 μm
   1.8 g of gelatine
   0.54 g of colourless coupler M-1
   0.24 g of DIR coupler D-1
   0.065 g of coloured coupler YM-1
   0.6 g of TCP 7th layer (High sensitivity, green-sensitive layer)

1.25 g of AgNO$_3$ of a spectrally green-sensitised Ag(Br,I) emulsion, 9 mol. % iodide, average grain diameter 0.8 μm
   1.1 g of gelatine
   0.195 g of colourless coupler M-2
   0.05 g of coloured coupler YM-2
   0.245 g of TCP 8th layer (Yellow filter layer)

0.09 g of yellow colloidal silver
   0.25 g of gelatine
   0.08 g of scavenger SC-1
   0.40 g of formaldehyde scavenger FF-1
   0.08 g of TCP 9th layer (Low sensitivity, blue-sensitive layer)

0.9 g of a spectrally blue-sensitised Ag(Br,I) emulsion, 6 mol. % iodide, average grain diameter 0.6 μm
   2.2 g of gelatine
   1.1 g of colourless coupler Y-1
   0.037 g of DIR coupler D-1
   1.14 g of TCP 10th layer (High sensitivity, blue-sensitive layer)

0.6 g of AgNO$_3$ of a spectrally blue-sensitised Ag(Br,I) emulsion, 10 mol. % iodide, average grain diameter 1.2 μm
   0.6 g of gelatine
   0.2 g of colourless coupler Y-1
   0.003 g of DIR coupler D-1
   0.22 g of TCP 11th layer (Micrate layer)

0.06 g of AgNO$_3$ of a micrate Ag(Br,I) emulsion, average grain diameter 0.06 μm, 0.5 mol. % iodide
   1 g of gelatine
   0.3 g of UV absorber UV-2
   0.3 g of TCP 12th layer (Protective & hardening layer)

0.25 g of gelatine
   0.75 g of hardener of the formula

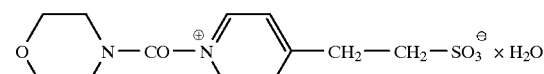

such that, once hardened, the overall layer structure had a swelling factor of ≦3.5.

Substances used in Example 1:
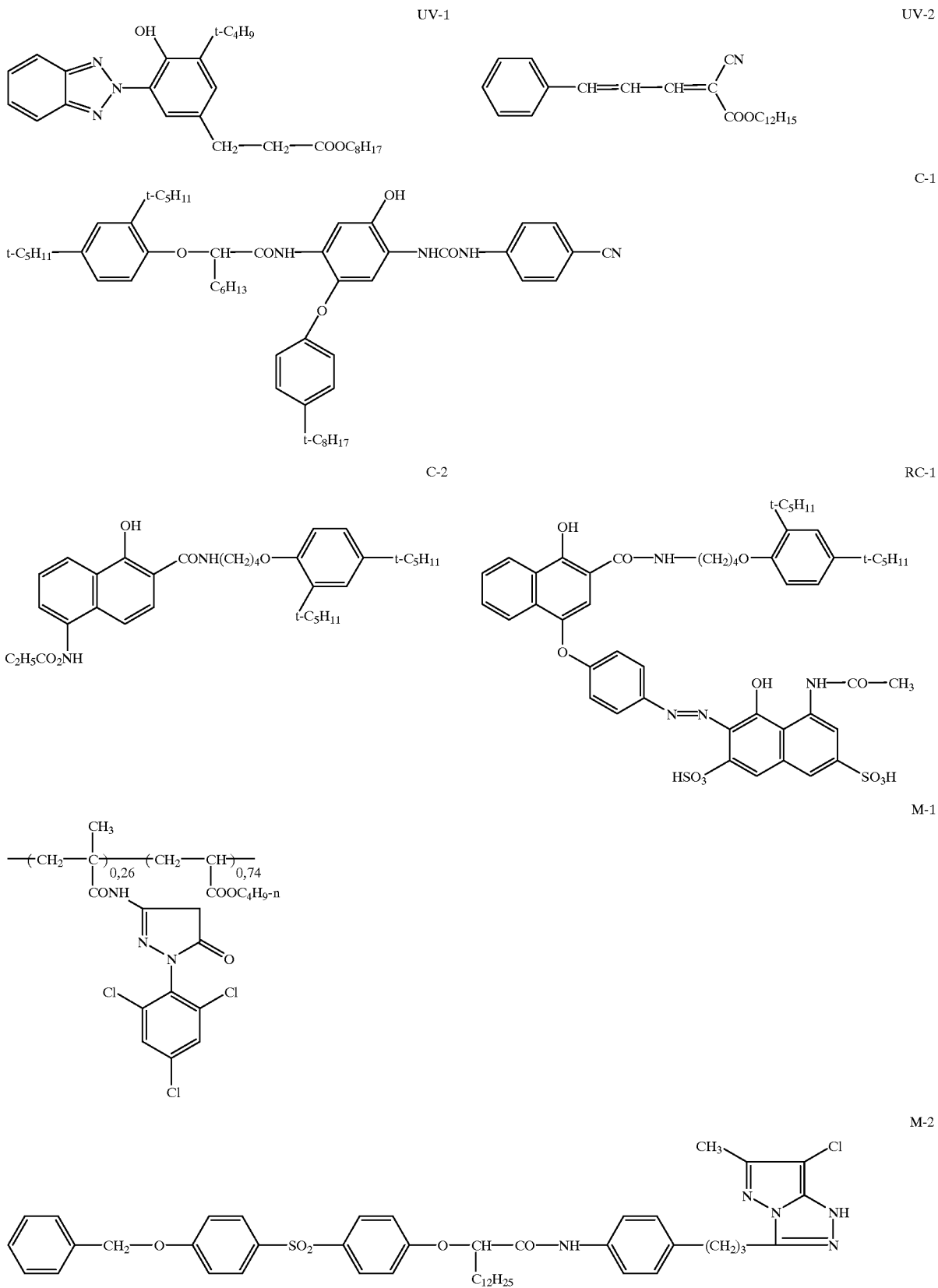

YM-1
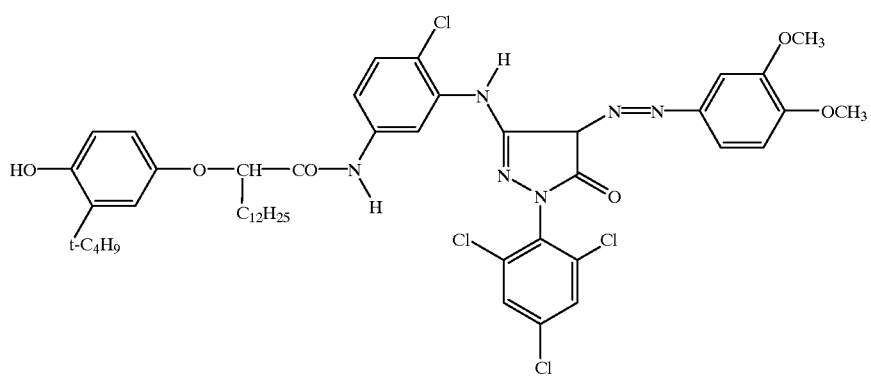
Y-1
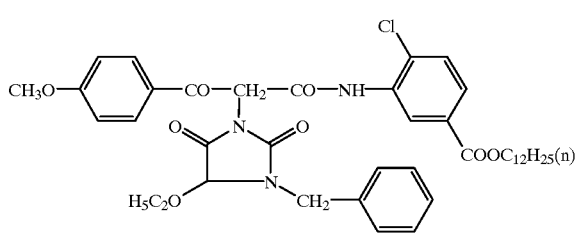
D-1
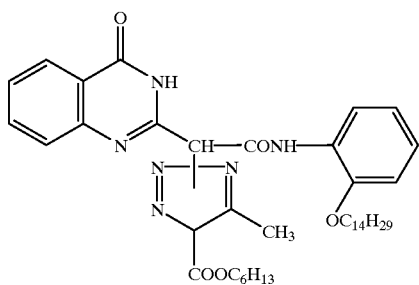
YC-1
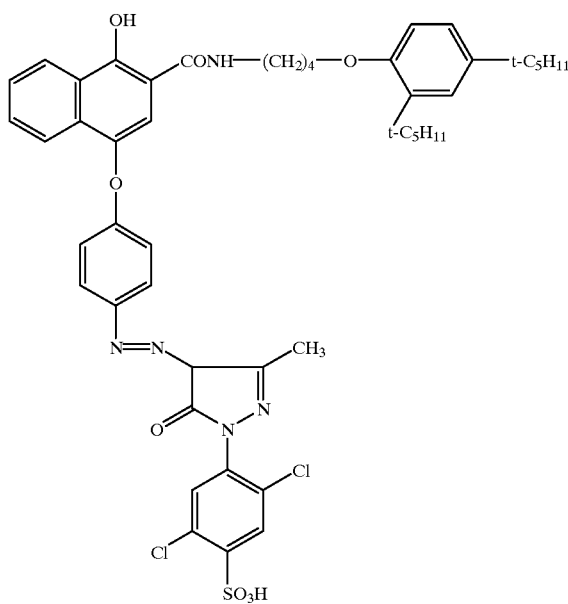
YM-2
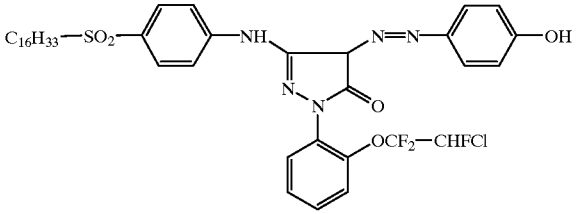
SC-1
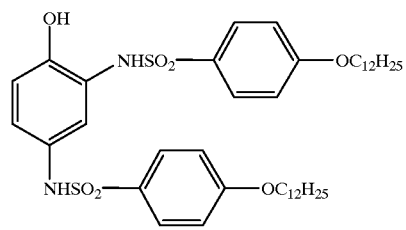
FF-1
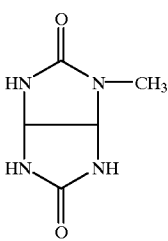

W-1

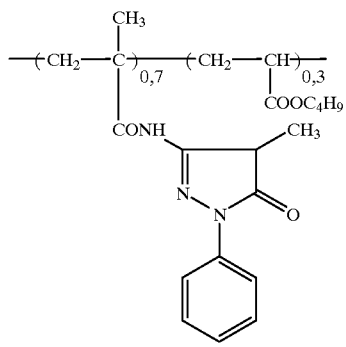

| | | |
|---|---|---|
| 3rd layer | (Low sensitivity, red-sensitive layer) | |
| 2.0 g | of AgNO$_3$ of a spectrally red-sensitised (Ag(Br,I)) emulsion containing 4 mol. % iodide, average grain diameter 0.5 μm | |
| 1.6 g | of gelatine | |
| 0.80 g | of colourless coupler C-1 | |
| 0.018 g | of DIR coupler D-1 | |
| 0.05 g | of coloured coupler RC-1 | |
| 0.07 g | of coloured coupler YC-1 | |
| 0.70 g | of TCP | |
| 4th layer | (High sensitivity, red-sensitive layer) | |
| 1.5 g | of AgNO$_3$ of a spectrally red-sensitised (Ag(Br,I)) emulsion, 12 mol. % iodide, average grain diameter 1.0 μm | |
| 1.4 g | of gelatine | |
| 0.17 g | of colourless coupler C-2 | |
| 0.15 g | of TCP | |
| 0.20 g | of polymer I-1 | |
| 6th layer | (Low sensitivity, green-sensitive layer) | |
| 1.7 g | of AgNO$_3$ of a spectrally green-sensitised (Ag(Br,I)) emulsion, 4 mol. % iodide, average grain diameter 0.35 μm | |
| 1.7 g | of gelatine | |
| 0.50 g | of colourless coupler M-1 | |
| 0.22 g | of DIR coupler D-1 | |
| 0.06 g | of coloured coupler YM-1 | |
| 0.55 g | of TCP | |
| 7th layer | (High sensitivity, green-sensitive layer) | |
| 0.85 g | of AgNO$_3$ of a spectrally green-sensitised (Ag(Br,I)) emulsion, 9 mol. % iodide, average grain diameter 0.8 μm | |
| 0.9 g | of gelatine | |
| 0.18 g | of colourless coupler M-2 | |
| 0.05 g | of colourled coupler YM-2 | |
| 0.23 g | of TCP | |
| 0.35 g | of polymer I-1 | |
| 9th layer | (Low sensitivity, blue-sensitive layer) | |
| 0.85 g | of a spectrally blue-sensitised (Ag(Br,I)) emulsion, 6 mol. % iodide, average grain diameter 0.6 μm | |
| 2.2 g | of gelatine | |
| 1.1 g | of colourless coupler Y-1 | |
| 0.037 g | of DIR coupler D-1 | |
| 1.14 g | of TCP | |
| 10th layer | (High sensitivity, blue-sensitive layer) | |
| 0.5 g | of AgNO$_3$ of a spectrally blue-sensitised (Ag(Br,I)) emulsion, 10 mol. % iodide, average grain | |

| | |
|---|---|
| | diameter 1.2 μm |
| 0.55 g | of gelatine |
| 0.2 g | of colourless coupler Y-1 |
| 0.003 g | of DIR coupler D-1 |
| 0.22 g | of TCP |
| 0.10 g | of polymer I-1 |

Layer structure 1D:

Layer structure 1D is identical to layer structure 1C, with the exception that polymer I-1 is omitted in the 4th, 7th and 10th layers.

Table 1 shows the sensitometric characteristics of layer structures 1A to 1D.

TABLE 1

| Layer structure | Layer application rate [g AgNO$_3$/m$^2$] | Sensitivity (relative) blue/green/red | Gradation blue/green/red | |
|---|---|---|---|---|
| 1A | 9.9 | 100/100/100 | 0.70/0.65/0.65 | Comparison |
| 1B | 9.9 | 125/130/118 | 0.82/0.80/0.75 | Comparison |
| 1C | 7.7 | 105/103/101 | 0.71/0.65/0.64 | Invention |
| 1D | 7.7 | 95/85/78 | 0.74/0.72/0.60 | Comparison |

As may be seen, the material according to the invention achieves the same sensitivity and gradation at a lower silver application rate.

Example 2

A base for reflected light prints is produced by providing paper of a weight of 90 g/m$^2$ and coated on both sides with polyethylene with a gelatine coat of a thickness of 7 μm. 0.1 wt. % (relative to gelatine) of $C_8F_7SO_3$—$(C_2H_5)_4N^+$ is used a wetting agent for coating (base 1).

Ink absorption is improved by producing further bases with the following coatings:

Base 2 (comparison)

5 g/m$^2$ of gelatine 2 g/m$^2$ of polyethyl acrylate as a latex with a particle size of 80 nm Base 3 (Comparison)

4 g/m$^2$ of gelatine 3 g/m$^2$ of polyacrylamide ($M_n$=20000)

Further bases according to the invention having the coating compositions shown in table 2 were produced in the same manner.

TABLE 2

| Base no. | Gelatine | Additive | Quantity |
| --- | --- | --- | --- |
| 4 | 5 g/m² | I-1 | 2.5 g/m² |
| 5 | 4 g/m² | I-2 | 3 g/m² |
| 6 | 4 g/m² | I-3 | 3 g/m² |
| 7 | 5 g/m² | I-1/I-2 | (50:50 wt. %) 2 g/m² |
| 8 | 4.5 g/m² | I-10 | 3.5 g/m² |

The bases described in Example 2 were printed with cyan, yellow and magenta stripes of a width of 1 cm and the colour densities $D_1$ achieved were measured with a Macbeth Densitometer. The printed bases are then pressed against a conventional commercial print paper, Agfa 2001, with a pair of pinch rollers, so transferring a proportion of the dyes onto the print paper. After this operation, the densities $D_2$ on the paper base are remeasured. The relative decrease in density $\Delta D_{rel}$ is an indication of the fastness of the dyes on the base $$\Delta D_{rel} = \frac{D_1 - D_2}{D_1} \cdot 100$$

The measured values are listed in table 3 and show that the bases produced with the polymers according to the invention exhibit improved absorption characteristics in relation to inkjet inks.

TABLE 3

| Base | Colour | $\Delta D_{rel}$ |
| --- | --- | --- |
| 1 | y | 11.2 |
| 1 | m | 12.6 |
| 1 | c | 10.4 |
| 2 | y | 10.8 |
| 2 | m | 9.3 |
| 2 | c | 8.7 |
| 3 | y | 10.5 |
| 3 | m | 9.8 |
| 3 | c | 11.3 |
| 4 | y | 3.2 |
| 4 | m | 4.1 |
| 4 | c | 2.8 |
| 5 | y | 5.3 |
| 5 | m | 4.7 |
| 5 | c | 4.1 |
| 6 | y | 3.8 |
| 6 | m | 2.9 |
| 6 | c | 3.4 |
| 7 | y | 3.2 |
| 7 | m | 4.2 |
| 7 | c | 4.5 |
| 8 | y | 3.7 |
| 8 | m | 2.7 |
| 8 | c | 3.4 | y = yellow; m = magenta; c = cyan

What is claimed is:

1. An image-recording material which comprises a support and at least one image-forming layer, and at least one layer of the material contains the polymer of the formula I:

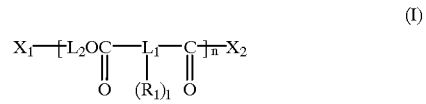

(I)

in which
  $X_1$ is H or $(R_1)_{l+1}$—CO—,
  $X_2$ is —$(L_2)_m$—OH or

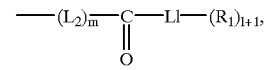

$R_1$ is —COO⁻M⁺, —SO₃⁻M⁺ or (M⁺)₂PO₃²⁻,
  $L_1$ is alkylene arylene, aralkylene or cycloalkylene.
  $L_2$ is the residue of a polyether having an average molecular weight of 200 to 3000 (number average),
  M⁺ is a cation,
  l is a number from 0 to 4,
  m is a number 0 or 1 and
  n is a number from 0 to 20, wherein
  m+n is ≧1.

2. An image-recording material according to claim 1, wherein the polymer of the formula I is present in a quantity of 10 to 1000 mg/m².

3. An image-recording material according to claim 1, wherein the material is a photographic silver halide material.

4. A photographic silver halide material according to claim 3, wherein the polymer of the formula I is used in a layer containing silver halide.

5. An image-recording material according to claim 1, wherein the material is an inkjet material.

6. An image-recording material which comprises a support in at least one image-forming layer and at least one-layer of the material contains a polymer is selected from the group consisting of I-1 to I-16:

I-1

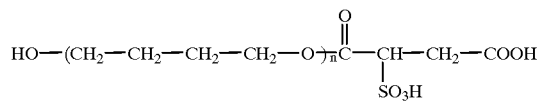

n~9

I-2

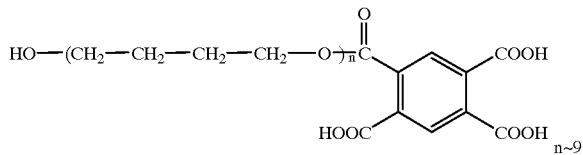

n~9

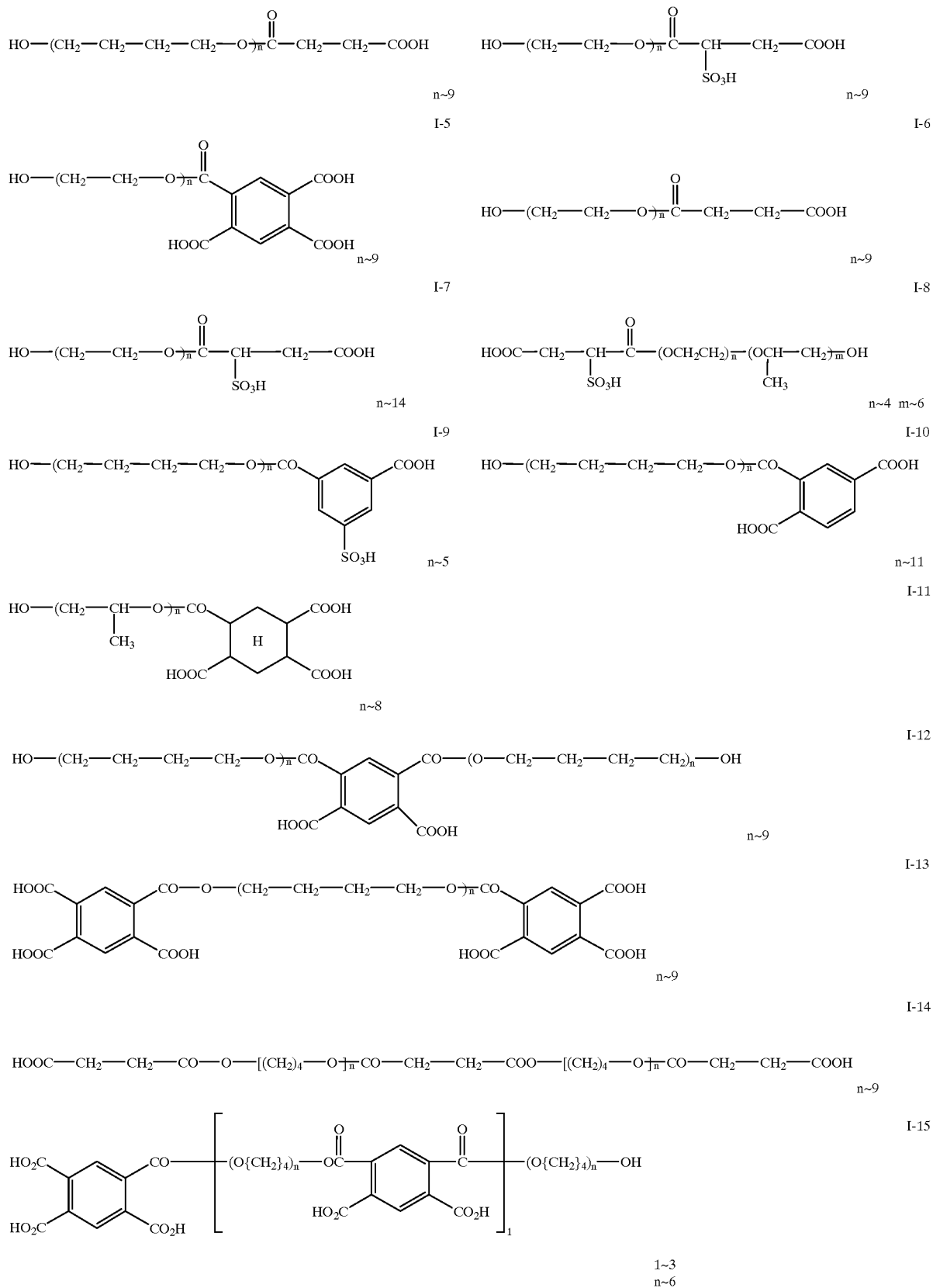

-continued

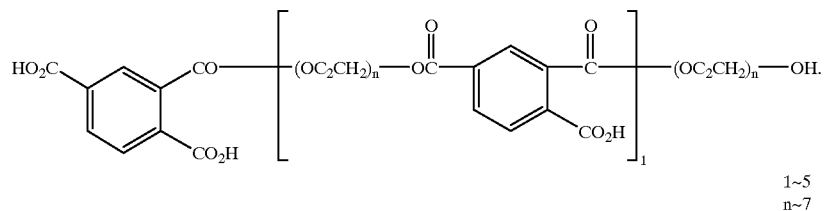

I-16

1~5
n~7

7. The image-recording material as claimed in claim 6, wherein the polymer is present in a quantity from 50 to 500 mg/m$^2$.

8. The image-recording material as claimed in claim 7, which further comprises a gelatin which is used as a binder and the quantity of said polymer in the layer is from 10 to 40 weight % of the quantity of gelatin.

9. The image-recording material as claimed in claim 6, which further comprises a gelatin which is used as a binder and the quantity of said polymer in the layer is from 5 to 50 weight % of the quantity of gelatin.

* * * * *

UNITED STATES PATENT AND TRADEMARK OFFICE
CERTIFICATE OF CORRECTION

PATENT NO. : 6,207,283 B1
DATED : March 27, 2001
INVENTOR(S) : Peter Bell et al.

It is certified that error appears in the above-identified patent and that said Letters Patent is hereby corrected as shown below:

Column 16,
Line 21 (claim 1, line 6), "$X_1$ is H or $(R_1)_{l+1}$-CO-," should read -- "$X_1$ is H or $(R_1)_{l+1}$-$L_1$-CO-, --.

Column 18, claim 6,
After formula 1-14 "n-9" should read -- n-6 --.

Signed and Sealed this

Twenty-third Day of October, 2001

Attest:

Nicholas P. Godici

NICHOLAS P. GODICI
*Attesting Officer*   *Acting Director of the United States Patent and Trademark Office*